United States Patent [19]
Reng

[11] Patent Number: 5,416,707
[45] Date of Patent: May 16, 1995

[54] METHOD AND APPARATUS FOR ELIMINATING AN INCLINATION OF A WHEEL-BLOCK BOGIE OR UNDERCARRIAGE

[75] Inventor: Leonhard Reng, Herzogenaurach, Germany

[73] Assignee: Siemens Aktiengesellschaft, München, Germany

[21] Appl. No.: 129,644

[22] Filed: Sep. 29, 1993

[30] Foreign Application Priority Data

Sep. 29, 1992 [EP] European Pat. Off. ........... 92116656
Apr. 16, 1993 [EP] European Pat. Off. ........... 93106248

[51] Int. Cl.$^6$ ............................................. B60G 25/00
[52] U.S. Cl. ........................ 364/426.01; 364/426.05; 180/197; 188/3 R; 246/182 B
[58] Field of Search ................. 364/426.01, 426.05; 180/197; 188/3 R; 246/182 B, 204, 205

[56] References Cited

U.S. PATENT DOCUMENTS 4,164,872  8/1979  Weigl .................................. 73/510
4,215,403  7/1980  Pollard et al. ...................... 364/424
5,124,921  6/1992  Jonner et al. .................. 364/426.01

FOREIGN PATENT DOCUMENTS 0374290  4/1992  European Pat. Off. .
3345260  6/1985  Germany .

OTHER PUBLICATIONS

ZEV-Glas. Ann. 114 (1990) No. 1/1/ Jan./Feb., pp. 24–29: *Aspekte zur Spurfuhrung*.

Primary Examiner—Kevin J. Teska
Assistant Examiner—Susan Wieland
Attorney, Agent, or Firm—Kenyon & Kenyon

[57] ABSTRACT

In a method and a device for eliminating an inclination of a wheel-block bogie of a rail vehicle having a plurality of individual wheels, the determined wheel speeds of the wheel-block bogie may be added in a crosswise manner. Sum speeds formed in this manner are combined to form an actual sum-difference speed which represents the actual inclination of the bogie, and this actual inclination is brought to a predeterminable desired inclination. In this way, an inclination of the wheel-block bogie is recognized and corrected without additional sensors, regardless of how it has been caused. As a result, optimum travel behavior is obtained in straight ahead travel and also on curves.

22 Claims, 4 Drawing Sheets

METHOD AND APPARATUS FOR ELIMINATING AN INCLINATION OF A WHEEL-BLOCK BOGIE OR UNDERCARRIAGE

BACKGROUND OF THE INVENTION

The present invention refers to a method and an apparatus for eliminating inclination of a wheel-block bogie (or undercarriage) which is provided with several individual wheels.

Rail vehicles consist of a car body and an undercarriage. The undercarriage has two purposes: It assumes the guidance of the vehicle in the track of the rails and must protect the car body from blows.

The tracking is ideal when the vehicle precisely follows the center of the rails. The faster deviations from the axis of the rails are corrected, the closer the tracking behavior of the undercarriage comes to ideal tracking.

The tracking behavior can be judged rapidly on the basis of merely two parameters, including:
the correction of transverse offset, and
the correction of a tilt in the rails.

Forces are necessary for the transverse shifting and a yawing moment is required for correction of the inclination. The latter, in its turn, requires forces which supply the desired moment with a lever arm around a suitable pivot point or as a force couple.

Forces which can be used for the guidance are produced in the wheel/rail contact surface. Depending on the physical effect, two fundamentally different types of forces can be distinguished.

Frictional (non-positive) forces are present when the wheel slides transversely or longitudinally relative to the rail at the wheel contact point. The product of relative speed times frictional force is a frictional power loss. It makes itself noticeable as resistance to tracking and is converted in the wheel/rail contact into heat and wear of the wheel and the rail. The wheel noise is also closely related thereto.

In the article "Askpekte zur Spurführung" (Aspects of Tracking), published in the journal ZEV-Glas. Ann. 114 (1990), No. ½, pages 24 to 29, various tracking principles are set forth and examined with regard to tracking behavior. The "wheel block" tracking principle is discussed in this article. In a wheel block, two individual wheels are used which are arranged one behind the other rather than alongside each other. The individual wheels arranged behind one another prove to be practically ideal for the correction of inclination. Frictional cross sections of equal size act on both wheels of the inclined wheel block due to the same angle of inclination δ. With reference to the pivot point, they compensate for the yawing moments produced thereby. From this point of view the wheel block is always in indifferent equilibrium. From any given position of the phase diagram of the wheel block, the transverse deflections and inclination are very rapidly reduced to values of about zero. The wheel block counteracts both the transverse offset and inclinations with profile side forces and is thus free of wear. The wheel block tracking principle would come very close to being ideal if there were no frictional longitudinal forces such as that present in the case of driven wheels.

A rail vehicle is described in European Patent Document No. EP 0 374 290 A1 which has, on both sides, along the longitudinal axis of the vehicle a predetermined number of individual wheels which are swingable by steering. A steering of each individual wheel which is free of tracking errors in all regions of curves is obtained in the manner that a rail path measuring device is provided which measures the deviation of an axle of the vehicle from the path of the rail and which, depending on measured deviations, produces a steering signal for each individual wheel independently, in each case, of the other wheel. Thus, in any curve each individual wheel is always correctly steered so that tracking errors can no longer occur.

Upon travel around curves, the wheel planes should ideally be tangential to the rail. Nevertheless, unconstrained travel of the wheels is assured only if the rolling radii of the wheels are relatively the same as the arc lengths of the two rails. This permits a transverse offset. The necessary difference in the rolling diameter due to the conicity of the wheel profiles of the two wheels results in the known travel condition of the wheel set. If, as a result of the rail guidance, the necessary difference in the rolling radii is greater than the possible difference based on the wheel profile, the wheels can no longer travel in unconstrained fashion. In other words, the wheel which is on the outside of the curve therefore turns too slowly and the wheel on the inside of the curve turns too fast. With respect to the vertical axis, a yawing moment is produced by the different frictional longitudinal forces, this moment turning the undercarriage, also known as the bogie, out of the arc. Running onto the wheel flange takes place whenever the bogie is inclined and therefore is no longer parallel to the rail or no longer travels tangentially to the rail along curves. The opposing moment can be applied only by the frictional transverse forces or by running onto the wheel flange, with corresponding wear.

SUMMARY OF THE INVENTION

The present invention provides a method and an apparatus for eliminating inclination of a wheel-block bogie (or undercarriage).

In accordance with the present invention, by combining in each case, two wheel speeds of rotation of two diagonally opposite individual wheels of the undercarriage in order to form, in each case, a sum signal, and combining them to form an actual sum-difference speed, one obtains an indication of the actual inclination of the bogie upon straight-ahead travel or travel around a curve. This actual sum-difference speed is compared with a predetermined set sum-difference speed which can be set in accordance with a predetermined tracking quality criterion. A correcting value is obtained from the difference in regulation between the set sum-difference speed and the actual sum-difference speed which is added to or subtracted from a set traction lever value or a common desired braking force. In this way, one obtains, for a control and regulating device or a control device of each wheel block of the undercarriage or bogie, a desired value with which, upon travel around curves or straight ahead, the resultant inclination of the bogie (drive or idle bogie) is done away with, as a result of which the travel quality of the undercarriage is substantially improved.

In this way, an ideal tracking behavior is obtained. That is, the wheel-block bogie can be guided in the ideal track without using additional transmitters. In this connection, it is immaterial whether the vehicle travels along a curve or on a straight line. It is also immaterial what disturbing influences such as, for instance, continuously varying condition of the rails could cause inclination since such an active tracking in accordance with the present invention determines the inclination indirectly via the wheel speeds and corrects it independently of the cause thereof.

A device in accordance with an embodiment of the present invention consists of adders, comparators, an algebraic sign member, and a controller, so that its construction is very simple and economical.

In another embodiment of the apparatus according to the present invention, an adaptation member is switched between the first comparator and the algebraic sign member, its second input being connected with an output of an averaging member. In this way, the actual sum-difference speed is referred to as an undercarriage speed.

The possibility of evaluating the actual sum-difference speed is better as the speed of the undercarriage and thus the speed of the vehicle is increased. This favors tracking at high speeds and thus, in particular, reduction in wear.

The method of the present invention for the recognition of inclination can also be employed without the use of the driving or braking forces. For example, it would be possible for the bogie to be turnable with respect to the car body by means of an adjustment mechanism so that a correction variable for such an adjustment mechanism can be obtained from the ascertained actual inclination as a function of a predetermined desired inclination. This correction value could also be used in an adjustment mechanism for steering the wheel sets with respect to the bogie. The special feature of the method and apparatus of the present invention for the recognition of inclination is that, as a function of the speeds of the individual wheels of a bogie, its inclination can be determined without additional transmitters being used.

BRIEF DESCRIPTION OF THE DRAWINGS

By way of further explanation of the method and apparatus of the present invention for the elimination of inclination of a wheel-block bogie (or undercarriage) having a plurality of individual wheels, reference is made to the drawings in which several embodiments are illustrated as follows.

DETAILED DESCRIPTION

Figure 1:
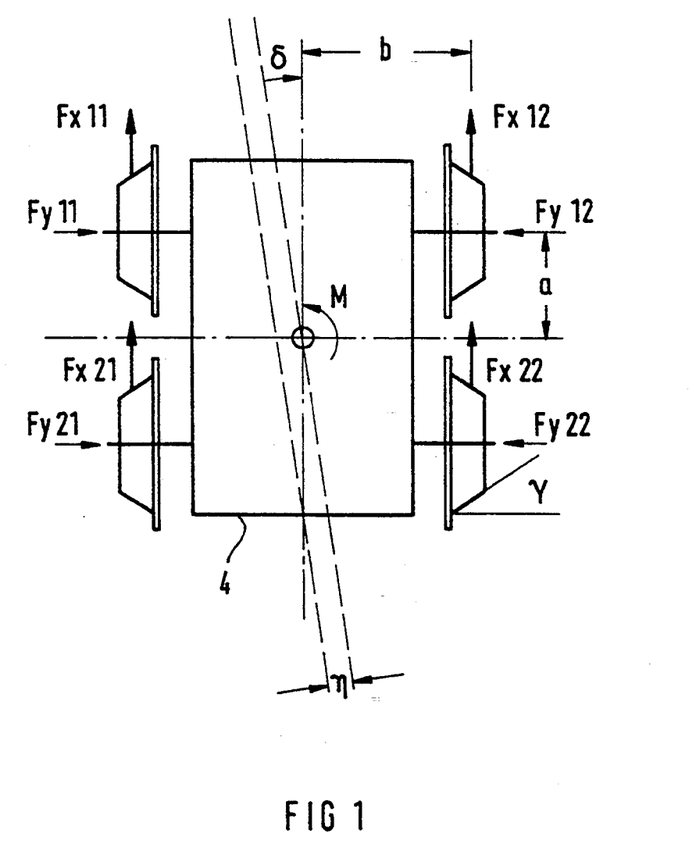
FIG. 1 diagrammatically illustrates a driven wheel-block bogie together with a setting moment, the frictional longitudinal forces, and the transverse forces.

The sketch of a bogie 4 illustrated in FIG. 1 serves to explain the forces and lever arms acting on the bogie 4. The bogie 4 is not provided with two conventional wheel sets (rigid axles), but is provided with four individual wheels 11, 12, 21 and 22. Each individual wheel 11, 12, 21 and 22 is driven via a gearing by a motor, the gearing and one motor not being illustrated in order not to clutter the drawing and to more clearly illustrate the embodiment of the present invention. The setting moment M is decisive for the position of the undercarriage 4 in the track. This moment, which is referred to at the vertical axis through the bogie center pin is equal to:

$$M=(Fx12+Fx22-Fx11-Fx21)b+(Fy12+Fy21-Fy11-Fy22)a,$$

in which
Fx11, Fx12, Fx21 and Fx22 are frictional longitudinal forces (drive force);
Fy11, Fy12, Fy21 and Fy22 are transverse forces;
b is half the distance between the wheel contact points;
a is half the wheel base;
R is the rolling radius;
M is the setting moment around the vertical axis;
is the transverse offset;
$\delta$ is the angle of inclination; and
$\gamma$ is the angle of inclination of the wheel profile.

The transverse forces Fyij are dependent on the portion of the weight of the vehicle which is to be taken up by the wheel, the angle of inclination of the wheel profile at the point of contact in question, the setting angle of the bogie with respect to the longitudinal axis of the rails and the wheel/rail slide angle. Upon transverse displacement of the wheel set in the rails, the transverse forces change essentially only when the angle of inclination of the wheel profile changes. With the wheel profile proposed, this angle, however, is constant within the possible travel range. As a result, the transverse forces remain constant and are identical on all wheels as long as no travel onto the wheel flange takes place. Thus, the transverse forces in the equation of moments indicated cancel each other out. The frictional longitudinal forces Fxij are the drive forces of the vehicle and can be influenced actively via the control device. For further consideration, the following simplified equation for calculating the setting moment is sufficient:

$$M=b(Fx12+Fx22-Fx11-Fx21).$$

The force Fxij is positive when the wheel circumferential speed at the wheel contact point is greater than the speed of the vehicle. In a corresponding manner, the force becomes zero upon identical speed or becomes negative when the wheel circumferential speed is less than the vehicle speed. Frictional longitudinal forces are therefore always to be viewed in connection with a wheel/rail slippage.

If the bogie 4 and thus the wheels 11, 12, 21 and 22 are moved at an angle $\delta$ obliquely to the plane of the wheels, the bogie 4 slides with a transverse slippage relative to the rail. The relative movement is opposed by a frictional lateral force Fy produced by the wheel/rail frictional connection. This leads to an undesired amount of rubbing which is converted into heat, wear and noise. The inclination can even lead to running onto the wheel flange and is only prevented in the manner that with the bogie 4 deflected obliquely around the vertical axis, a yawing moment M is produced which effects a return movement into a position parallel to the direction of travel or parallel to the rails, i.e. the inclination $\delta$ again becomes zero.

The transverse offset by itself produces neither wear nor noise and is therefore without any tracking disadvantages. As a result of the conicity of the wheel profile, however, different rolling radii result and, depending on the drive concept selected, differences occur in the frictional longitudinal forces, so that a yawing moment M is produced.

Running onto the wheel flange can only be prevented in the manner that once the wheel set or bogie is deflected, a setting moment is produced which causes return movement into the center position.

Figure 2:
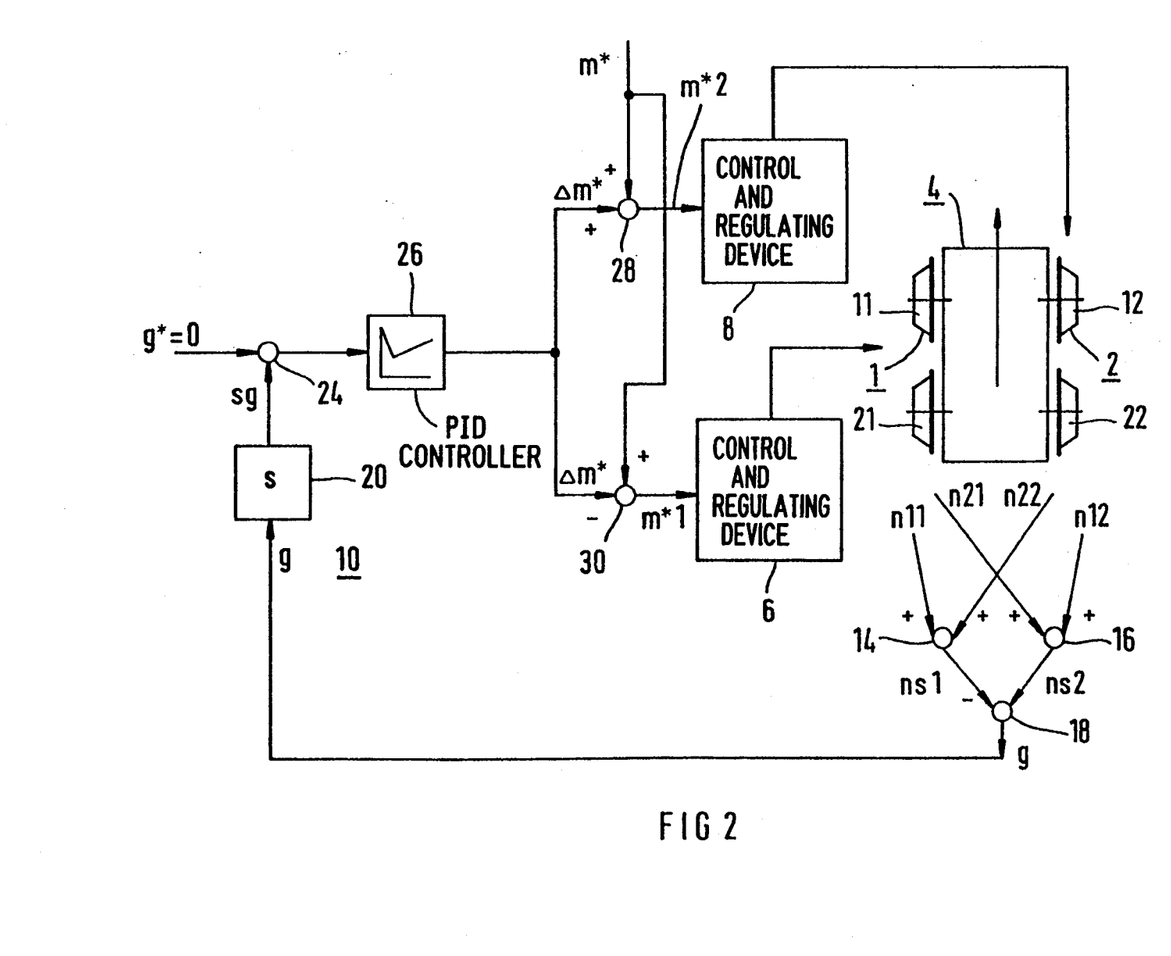
FIG. 2 is a block diagram of a device for carrying out the method of the present invention in the case of a driven wheel-block bogie.

FIG. 2 illustrates a block diagram of a device for implementing the method of the present invention for eliminating inclination of an undercarriage 4 having several individual wheels 11, 12, 21 and 22, this undercarriage also being known as a driven bogie. A travel motor is associated with each individual wheel 11, 12, 21 and 22 (not shown in the drawing for clarity). In the case of undercarriage 4, the individual wheels 11, 12, 21 and 22 are fed in wheel blocks. For this purpose, the traction motors of the individual wheels 11 and 21 are fed from a first setting member, for instance a converter and preferably a pulse converter, and the traction motors of the individual wheels 12 and 22 are fed by a second setting member, for instance a converter and particularly a pulse converter. These converters have also not been shown in the drawing to avoid confusion and for a better understanding of the present invention. There is thus the possibility of driving the left wheel block 1 with a different moment of rotation and speed than the right wheel block 2, which is advantageous, in particular, for constriction-free travel around curves.

The drive moments $m^*1$ and $m^*2$ of the left and right motors are made approximately equal to each other by means of two control and regulating devices 6 and 8. If exactly the same motor moments of rotation $m^*1$ and $m^*2$ are imparted by means of these two control and regulating devices 6 and 8 on both sides of the bogie 4, one can, under the theoretical assumption of identical rolling radii on all four wheels 11, 12, 21 and 22, expect straight-ahead travel of the bogie 4.

The regulating of the moment of rotation of these traction motors of the individual wheels 11, 12, 21 and 22 of the undercarriage 4 which are fed as wheel blocks has a tracking quality control circuit 10 superimposed on it. As a result, an inclined position is recognized with any arc radius and by suitable control measures on the traction motors of the individual wheels 11, 12, 21 and 22 which are fed in wheel blocks the frictional longitudinal forces are regulated so that a return movement from the determined inclined position takes place.

This superimposed quality control circuit 10 consists on an input side of two adders 14 and 16, which are connected on an output side to a first comparator 18. The adder 14 adds the wheel speeds n11 and n22 of two diagonally opposite individual wheels 11 and 22 of the undercarriage 4 and the adder 16 adds the wheel speeds n12 and n21 of the two other diagonally opposite individual wheels 12 and 21 of undercarriage 4. The adder 14 provides an output corresponding to a first sum speed ns1 and adder 16 provides an output corresponding to a second sum speed ns2. First comparator 18 provides an output corresponding to an actual sum-difference speed g which represents a measure of the inclination of the undercarriage 4 in the rails. Thus, the actual sum-difference speed g is also referred to as the actual inclination value g.

The output of the first comparator 18 is provided to an algebraic sign member 20 which provides the actual sum-difference speed g or the actual inclination value g determined with an algebraic sign s. Sign s is equal to $+1$ during rearward travel or forward braking (with a negative set traction lever value $m^*$) and $-1$ during forward travel or rearward braking (with a positive set traction lever value $m^*$). This actual information with sign sg is fed to a first input of a first additional adder 24. A desired inclination value $g^*$ is provided at a second input of adder 24. In order that the inclination of the undercarriage 4 in the rails which has been ascertained can be done away with, the ascertained actual inclination value g must, in the normal case, be adjusted to zero. For this reason, in this case the desired inclination value $g^*$ is equal to zero. From the sum signal present at the output of the additional adder 24, a correction variable $\Delta m^*$ is produced by means of a controller 26, in particular a proportional-integral-differential controller (PID controller). This correction variable $\Delta m^*$ is fed to an adder 28 and a subtractor 30, at the first inputs of which a desired throttle-lever value $m^*$ is provided, which is also known as a desired torque value. The output of the adder 28 is connected to the control and regulating device 8 for the setting member of the motors of the individual wheels 12 and 22 of the right-hand wheel block 2. Similarly, the output of the subtractor 30 is connected to the control and regulating device 6 for the setting member for the motors of the individual wheels 11 and 21 of the left wheel block 1. Desired torque values $m^*2$ and $m^*1$ are respectively provided at the output of the adder 28 and the subtractor 30 which change the frictional longitudinal forces via the converters in the manner that the motors of the individual wheels 12 and 22 of the right wheel-block 2 develop somewhat more torque and the motors of the individual wheels 11 and 21 of the left wheel block 1 develop somewhat less torque. In this way, a yawing moment is produced which counteracts the inclination, as a result of which the bogie 4 turns out of the oblique position until the ideal tracking parallel to the rails has again been reached. When this condition has been reached, the actual inclination value g is equal to zero and the control process is at an end.

In accordance with the present invention, by combining the four speeds of the individual wheels of the undercarriage 4, the recognition of an inclination takes place without any additional transmitter and with the aid of a tracking quality criterion. The ideal tracking is present when the crosswise combining of the four wheel speeds, in accordance with the tracking quality criterion of the present invention:

$$g = (n12 + n21) - (n11 + n22) \text{ (tracking quality criterion)},$$

is equal to a predeterminable desired inclination $g^*$. In the normal case, this predeterminable desired inclination $g^*$ is equal to zero, but it may also be different from zero (e.g., due to optimizing).

Assuming that the bogie 4 turns, as indicated in FIG. 1, in a clockwise direction with respect to the direction of the rails (i.e. the inclination angle $\delta$ is positive), the rolling radii of the diagonally opposite wheels 12 and 21 are greater than those of the other diagonally opposite wheels 11 and 22. The measured motor speeds n11, n12, n21 and n22 are related accordingly to the tracking quality criterion and an actual inclination value g which is less than zero is obtained. The actual inclination g would be greater than zero with a bogie 4 turned in a counterclockwise direction. As already pointed out, a yawing moment which counteracts the inclination is produced on the bogie 4 as a function of this actual ascertained inclination g.

The evaluation of the actual inclination value g is better as the speed of rotation and thus the speed n of the vehicle are increased. This, in particular, favors tracking at high speeds and thus reduction in wear.

The tracking quality criterion applies to any arc radii r, since the difference in speed of rotation between the inner travelling wheel block and the outer travelling wheel block is eliminated due to the diagonal addition of the speeds of rotation.

The same also applies to the transverse offset of the bogie 4. A purely transverse offset from the center of the rails does not impair the tracking. With a transverse offset towards the right, for example, the speeds n11 and n21 of the left wheel block 1 increase while the speeds n12 and n22 of the right wheel block 2 decrease. The differences in speed cancel each other out as desired in the tracking quality criterion, similar to travelling around a curve, as a result of the diagonal addition of the speeds. The tracking quality criterion also provides the correct result g in this case.

Figure 3:
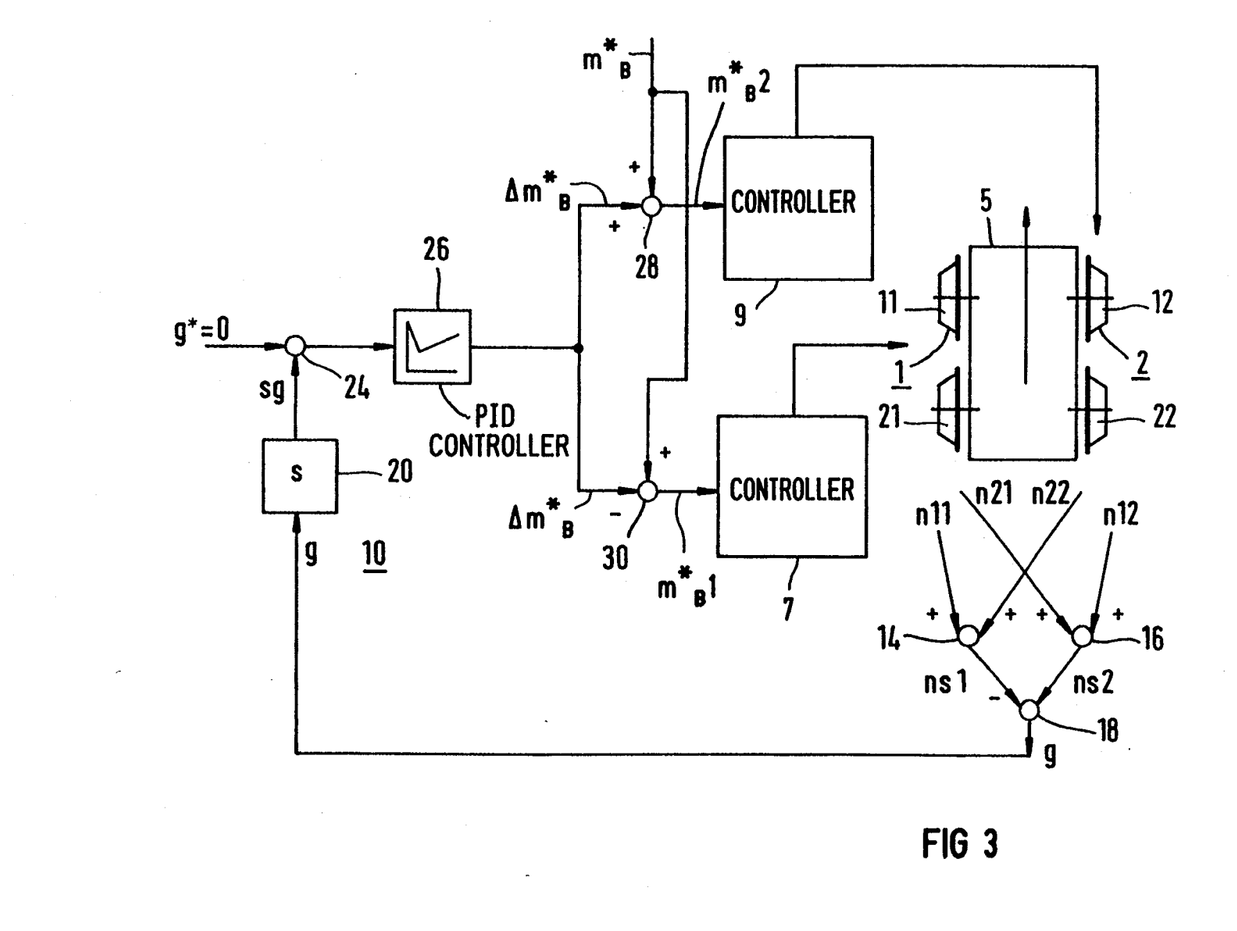
FIG. 3 is a block diagram of a device for carrying out the method of the present invention in the case of a non-driven wheel-block bogie.

FIG. 3 illustrates a block diagram of a device for carrying out an embodiment of the present invention. The device of FIG. 3 eliminates inclination of a running carriage 5 having several individual wheels 11, 12, 21 and 22, also known as a travel bogie or a driveless bogie. As in FIG. 2, a speed measuring device is associated with each individual wheel 11, 12, 21 and 22 (not shown in detail in order to avoid clutter in the drawing). Furthermore, a separate braking device, also not shown in detail, is associated with each of the wheel blocks 1 and 2. These braking devices are operated by control devices 7 and 9. In this connection, the control device 7 acts on the braking device of the individual wheels 11 and 12 of the left wheel block 1 and the control device 9 acts on the braking device of the individual wheels 21 and 22 of the right wheel block 2. Respective braking moments $m^*_{B1}$ and $m^*_{B2}$ are fed to the control devices 7 and 9 when the travel bogie 5 has an ideal tracking behavior, each of which is equal to a common desired braking-force value $m^*_B$. A tracking quality control circuit 10 is superimposed on the braking control circuit in accordance with FIG. 2. This tracking quality control circuit 10 produces, as a function of the measured wheel speeds n11, n12, n21 and n22, an actual inclination g which is adjusted to a predetermined desired inclination g* (in the normal case, equal to zero). A brake setting variable $\Delta m^*_B$ is added to the braking force value $m^*_B$ by adder 28 to provide the braking force moment $m^*_{B2}$ of a wheel block 2. Similarly, the brake setting variable $\Delta m^*_B$ is subtracted from the braking-force value $m^*_B$ by subtractor 30 to provide the braking force moment $m^*_{B1}$ of the other wheel block 1. The sign S of the algebraic sign member 20 is equal to +1 upon forward travel (in the direction of the arrow) and −1 upon rearward travel (opposite the direction of the arrow). Otherwise this tracking quality control circuit 10 operates in the same manner as in the case of the drive bogie 4 in accordance with FIG. 2.

When the vehicle is in a condition of "drive" or "roll out", the required yawing moment for a travel bogie can be obtained by a slight "initial braking" of the corresponding wheel block 1 or 2. The tracking quality control circuit 10 is independent of the brake system. The brake system can be based on any desired physical principles as long as each wheel block 1 and 2 has a braking device of its own.

This track guidance method can, in principle, also be used when only a single wheel on each side of the bogie is braked.

The principle can also be applied to drive bogies in which the electric drive unit has failed and the mechanical brake (spare brake) is activated in replacement thereof.

Figure 4:
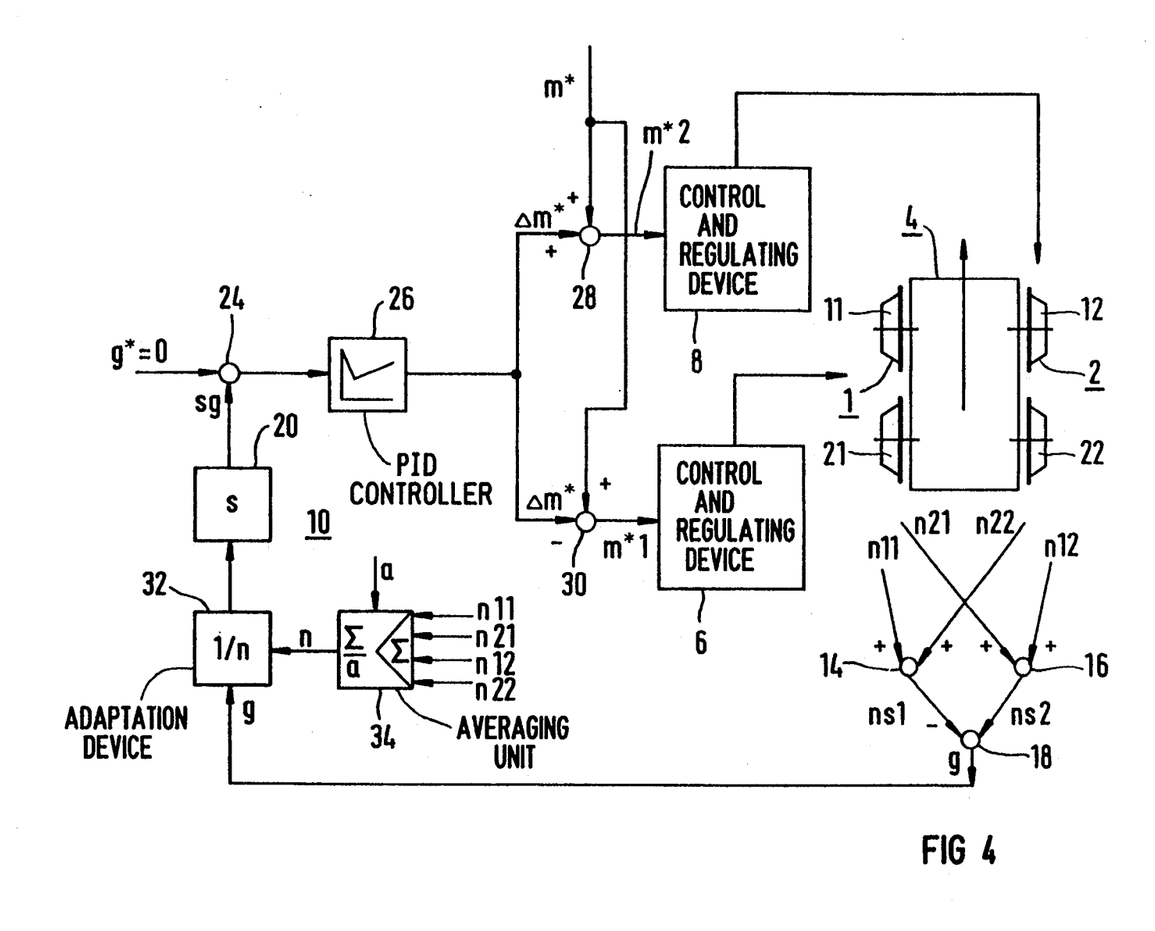
FIG. 4 is a block diagram of an advantageous device in accordance with FIG. 2.

FIG. 4 illustrates a block diagram of an advantageous embodiment of the device of the present invention according to the embodiments of FIGS. 2 and 3. The difference from the device illustrated in FIG. 2 is that an adaption member 32 is provided between first comparator 18 and the algebraic sign member 20. A first input of adaption member 32 is provided with the output g of comparator 18 and the second input of member 32 is connected to an output of an averaging unit 34. The determined wheel speeds 11, 12, 21 and 22 are provided as first inputs of averaging unit 34 and the numerical value of the number a of individual wheels 11, 12, 21 and 22 of the undercarriage 4 are provided as the second input of averaging unit 34. Averaging unit 34 totals the wheel speeds n11, n12, n21 and n22 present and divides this sum by the number a of individual wheels 11, 12, 21 and 22 of the undercarriage 4 so that an undercarriage speed n is present at the output. The adaptation member 32 adapts the determined actual inclination g to the undercarriage speed n. In this way, the superimposed tracking quality control circuit 10 is independent of the speed of the bogie 4.

The superimposed tracking quality control circuit 10, also known as active tracking, makes possible, without additional sensor mechanisms such as, for instance, articulation angle transmitters, optimum travel both on a straight line and on curves. An inclination of the bogie 4 or 5 can be consistently practically recognized and corrected, regardless of how it is caused. Thus, for instance, an inclining of the bogie 4 as a result of unilateral sliding and centrifugal processes can be recognized and corrected.

Different wheel diameters between the right and left sides of the bogies 4 and 5 respectively play no part. The wheel diameters on one side must be the same, but this is assured by the connection in parallel of the traction motors.

This active track guidance is an ideal solution of the track guidance problem. The rolling condition is always satisfied. Without additional transmitters, the bogie 4 or 5 can be guided in the ideal track. In this connection, it is immaterial whether the vehicle is travelling around a curve or straight ahead. It is also immaterial what disturbing influences, such as, for instance, continuously changing condition of the rails, might cause an inclination since the active track guidance determines the inclination and corrects it independently of its cause.

The method for eliminating inclination of an undercarriage 4 which has been described above is also applicable to bogies having traction motors which are individually fed by a converter. Furthermore, the method described above can also be employed in the case of bogies which are arranged to be turnable with respect to the car body by means of a setting mechanism. Furthermore, the method can be employed in the case of a bogie in which its wheels are turnable with respect to the bogie by means of a setting mechanism.

What is claimed is:

1. An apparatus for eliminating an inclination of a wheel block bogie having a plurality of individual wheels, traction motors of which are fed in wheel blocks, said apparatus comprising:

a plurality of adders each adding two measured wheel speeds of two diagonally opposite individual wheels of the wheel-block bogie to form a sum speed at an output of said adder;

a comparator having inputs connected to said outputs of said plurality of adders and having an output;

an algebraic sign device having an input responsive to said output of said comparator and having an output indicating an actual inclination of the wheel-block bogie;

a first additional adder adding the output of said algebraic sign device to a set sum-difference speed value;

a controller providing a correction variable in response to an output of said first additional adder;

a second additional adder adding the correction variable provided by said controller to a set traction level value;

a subtractor subtracting the output of said controller from said set traction level value; and a plurality of control and regulating devices controlling said traction motors to eliminate said inclination of said wheel-block bogie in response to outputs of said second additional adder and said subtractor.

2. An apparatus for eliminating an inclination of a wheel block bogie according to claim 1, further comprising:

an averaging device determining an average wheel speed; and an adaptation device adapting the output of the comparator to the determined average wheel speed and providing an adapted output to the algebraic sign device.

3. An apparatus for eliminating an inclination of a wheel-block bogie according to claim 2, wherein the measured wheel speeds are provided at first inputs of the averaging unit and a number of individual wheels of the wheel-block bogie are provided at a second input of said averaging unit.

4. An apparatus for eliminating an inclination of a wheel block bogie according to claim 1, wherein said wheel block bogie is included in a rail vehicle.

5. An apparatus for eliminating an inclination of a wheel block bogie according to claim 1, wherein said individual wheels are independently movable.

6. An apparatus for eliminating an inclination of a running carriage having a plurality of individual wheels, braking devices of which are fed in wheel blocks, said apparatus comprising:

a plurality of adders each adding two measured wheel speeds of two diagonally opposite individual wheels of the running carriage to form a sum speed at an output of said adder;

a comparator having inputs connected to said outputs of said plurality of adders and having an output;

an algebraic sign device having an input responsive to said output of said comparator and having an output indicating an actual inclination of the running carriage;

a first additional adder adding the output of said algebraic sign device to a set sum-difference speed value;

a controller providing a correction variable in response to an output of said first additional adder;

a second additional adder adding the correction variable provided by said controller to a set braking force value;

a subtractor subtracting the output of said controller from said set braking force value; and a plurality of control and regulating devices controlling said braking devices to eliminate said inclination of said running carriage in response to outputs of said second additional adder and said subtractor.

7. An apparatus for eliminating an inclination of a wheel block bogie according to claim 6, further comprising:

an averaging device determining an average wheel speed; and an adaptation device adapting the output of the comparator to the determined average wheel speed and providing an adapted output to the algebraic sign device.

8. An apparatus for eliminating an inclination of a running carriage according to claim 7, wherein the measured wheel speeds are provided at first inputs of the averaging unit and a number of individual wheels of the running carriage are provided at a second input of said averaging unit.

9. An apparatus for eliminating an inclination of a running carriage according to claim 6, wherein said running carriage is included in a rail vehicle.

10. An apparatus for eliminating an inclination of a running carriage according to claim 6, wherein said individual wheels are independently movable.

11. A method of eliminating an inclination of wheel-block bogie of a rail vehicle having a plurality of individual wheels, traction motors of the vehicle being fed in wheel blocks by means of two control and regulating devices, said method comprising steps of:

determining wheel speeds of said wheels;

adding determined wheel speeds of diagonally opposite individual wheels of the wheel-block bogie;

comparing the added wheel speeds to form an actual sum-difference value;

adding a direction signal to the actual sum-difference value;

adding the actual sum-difference value to which the direction signal has been added to a set sum-difference speed value to provide a correction variable;

adding said correction variable to a set traction level value to provide a first set torque value for a first of said wheel blocks;

subtracting said correction variable from said set traction level value to provide a second set torque value for a second of said wheel blocks; and controlling said traction motors to eliminate said inclination of said wheel-block bogie in response to said first and second set torque values.

12. A method according to claim 11, further comprising steps of:

determining a wheel-block bogie speed by adding the wheel speeds divided by a number of said wheels; and adapting the actual sum-difference value to the determined wheel-block bogie speed, said adapted value being used in said direction signal adding step.

13. A method of eliminating an inclination of a wheel block bogie of a rail vehicle according to claim 12, wherein said individual wheels are independently movable.

14. An apparatus for eliminating an inclination of a wheel block bogie according to claim 2, wherein said wheel block bogie is included in a rail vehicle.

15. An apparatus for eliminating an inclination of a wheel block bogie according to claim 2, wherein said individual wheels are independently movable.

16. A method of eliminating an inclination of a wheel block bogie of a rail vehicle according to claim 11, wherein said individual wheels are independently movable.

17. A method of eliminating an inclination of a running carriage of a rail vehicle having a plurality of individual wheels, braking devices of the vehicle being fed in wheel blocks by means of two control and regulating devices, said method comprising steps of:
  determining wheel speeds of said wheels;
  adding determined wheel speeds of diagonally opposite individual wheels of the running carriage;
  comparing the added wheel speeds to form an actual sum-difference value;
  adding a direction signal to the actual sum-difference value;
  adding the actual sum-difference value to which the direction signal has been added to a set sum-difference speed value to provide a correction variable;
  adding said correction variable to a set braking force value to provide a first set braking force value for a first of said wheel blocks;
  subtracting said correction variable from said set braking force value to provide a second set braking force for a second of said wheel blocks; and
  controlling said braking devices to eliminate said inclination of said running carriage in response to said first and second set braking force values.

18. A method according to claim 17, further comprising steps of:
  determining a running carriage speed by adding the wheel speeds divided by a number of said wheels; and
  adapting the actual sum-difference value to the determined running carriage speed, said adapted value being used in said direction signal adding step.

19. A method of eliminating an inclination of a running carriage of a rail vehicle according to claim 18, wherein said individual wheels are independently movable.

20. An apparatus for eliminating an inclination of a running carriage according to claim 7, wherein said running carriage is included in a rail vehicle.

21. An apparatus for eliminating an inclination of a running carriage according to claim 7, wherein said individual wheels are independently movable.

22. A method of eliminating an inclination of a running carriage of a rail vehicle according to claim 17, wherein said individual wheels are independently movable.

* * * * *